US009026784B2

(12) United States Patent
Buruganahalli et al.

(10) Patent No.: US 9,026,784 B2
(45) Date of Patent: May 5, 2015

(54) SYSTEM AND METHOD FOR INNOVATIVE MANAGEMENT OF TRANSPORT LAYER SECURITY SESSION TICKETS IN A NETWORK ENVIRONMENT

(75) Inventors: Shivakumar Buruganahalli, San Jose, CA (US); Venu Vissamsetty, San Jose, CA (US)

(73) Assignee: McAfee, Inc., Santa Clara, CA (US)

( * ) Notice: Subject to any disclaimer, the term of this patent is extended or adjusted under 35 U.S.C. 154(b) by 2 days.

(21) Appl. No.: 13/358,836

(22) Filed: Jan. 26, 2012

(65) Prior Publication Data

US 2013/0198509 A1    Aug. 1, 2013

(51) Int. Cl.
*H04L 29/06* (2006.01)
*H04L 9/32* (2006.01)

(52) U.S. Cl.
CPC .......... *H04L 63/168* (2013.01); *H04L 2209/38* (2013.01); *H04L 63/0807* (2013.01)

(58) Field of Classification Search
CPC . H04L 63/0428; H04L 63/166; H04L 63/168; H04L 63/08; H04L 9/32; H04L 63/0823; H04L 63/164; H04L 63/0807; H04L 9/3213; G06F 15/16; G06F 21/33
USPC .......................................... 713/151, 176, 150
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 6,766,373 B1 * | 7/2004 | Beadle et al. | 709/227 |
| 7,089,585 B1 * | 8/2006 | Dharmarajan | 726/8 |
| 7,185,047 B1 | 2/2007 | Bate et al. | |
| 7,185,847 B1 | 3/2007 | Bouchard et al. | |
| 7,272,719 B2 | 9/2007 | Bleckmann et al. | |

(Continued)

FOREIGN PATENT DOCUMENTS

| | | |
|---|---|---|
| EP | 1601153 B1 | 7/2010 |
| WO | 2013/112816 A1 | 8/2013 |

OTHER PUBLICATIONS

Blake-Wilson, S., et al., "Transport Layer Security (TLS) Extensions," copyright Apr. 2006, The Internet Society, 31 pages.

(Continued)

*Primary Examiner* — Eleni Shiferaw
*Assistant Examiner* — Nelson Scott Giddins
(74) *Attorney, Agent, or Firm* — Patent Capital Group

(57) ABSTRACT

An example method includes identifying a transport layer security (TLS) session between a client and a server, parsing one or more TLS messages to identify a session ticket associated with the session, transforming the session ticket into a fixed size session token, and managing the session using the session token to identify the session. The transforming may include computing a hash value of the session ticket using a hashing algorithm. If any of the TLS messages is spread across more than one TLS protocol record, the method can include computing a hash value of a portion of the session ticket encountered in a TLS protocol record using a hashing algorithm, incrementally computing another hash value of another portion of the session ticket encountered in a subsequent TLS protocol record from the previously computed hash value, and repeating the incremental computing until portions of the session ticket have been processed.

20 Claims, 3 Drawing Sheets

(56) References Cited

U.S. PATENT DOCUMENTS

| | | | |
|---|---|---|---|
| 7,290,288 B2 | 10/2007 | Gregg | |
| 7,409,704 B1 | 8/2008 | Charas | |
| 7,506,155 B1 | 3/2009 | Stewart et al. | |
| 7,739,724 B2 | 6/2010 | Durham et al. | |
| 8,082,351 B1 * | 12/2011 | Kelley et al. | 709/227 |
| 8,095,787 B2 * | 1/2012 | Kanekar et al. | 713/156 |
| 8,245,285 B1 * | 8/2012 | Ravishankar et al. | 726/9 |
| 8,352,728 B2 * | 1/2013 | Suganthi et al. | 713/153 |
| 8,387,130 B2 * | 2/2013 | Love et al. | 726/15 |
| 8,671,439 B2 | 3/2014 | Durham et al. | |
| 8,826,378 B2 | 9/2014 | Durham et al. | |
| 2002/0146132 A1 * | 10/2002 | Medvinsky | 380/279 |
| 2003/0115341 A1 * | 6/2003 | Sinha et al. | 709/229 |
| 2003/0149871 A1 * | 8/2003 | Medvinsky | 713/155 |
| 2003/0149880 A1 * | 8/2003 | Shamsaasef et al. | 713/182 |
| 2003/0229808 A1 | 12/2003 | Heintz et al. | |
| 2005/0132122 A1 | 6/2005 | Rozas | |
| 2005/0138417 A1 | 6/2005 | McNerney et al. | |
| 2006/0041938 A1 * | 2/2006 | Ali | 726/14 |
| 2006/0161974 A1 * | 7/2006 | Innes et al. | 726/10 |
| 2006/0206932 A1 * | 9/2006 | Chong | 726/10 |
| 2006/0218402 A1 * | 9/2006 | Kerstens et al. | 713/170 |
| 2007/0006282 A1 | 1/2007 | Durham et al. | |
| 2007/0101159 A1 * | 5/2007 | Zhang et al. | 713/193 |
| 2008/0294586 A1 | 11/2008 | Lim | |
| 2009/0007217 A1 * | 1/2009 | Birger et al. | 726/1 |
| 2009/0019537 A1 * | 1/2009 | Stavrou et al. | 726/13 |
| 2009/0034743 A1 * | 2/2009 | De Petris et al. | 380/285 |
| 2009/0234954 A1 * | 9/2009 | Sheehan | 709/228 |
| 2009/0323954 A1 * | 12/2009 | Sprunk et al. | 380/259 |
| 2010/0071032 A1 | 3/2010 | Durham et al. | |
| 2010/0100953 A1 * | 4/2010 | Mowers et al. | 726/10 |
| 2010/0107224 A1 | 4/2010 | Durham et al. | |
| 2010/0250951 A1 * | 9/2010 | Ueno et al. | 713/176 |
| 2010/0293385 A1 * | 11/2010 | Nanda et al. | 713/176 |
| 2011/0010543 A1 * | 1/2011 | Schmidt et al. | 713/168 |
| 2011/0154031 A1 * | 6/2011 | Banerjee et al. | 713/165 |
| 2011/0302646 A1 * | 12/2011 | Ronda et al. | 726/9 |
| 2011/0302653 A1 * | 12/2011 | Frantz et al. | 726/22 |
| 2012/0084561 A1 * | 4/2012 | Soulios | 713/168 |
| 2012/0240212 A1 * | 9/2012 | Wood et al. | 726/10 |
| 2013/0024688 A1 * | 1/2013 | Wen et al. | 713/168 |
| 2013/0198509 A1 * | 8/2013 | Buruganahalli et al. | 713/151 |

OTHER PUBLICATIONS

M-8000 Sensor Product Guide, McAfee® Network Security Platform, copyright © 2011 McAfee, Inc., 38 pages.

McAfee IntruShield Network IPS Sensor, Data Sheet, copyright © 2004 Networks Associates Technology, Inc., 8 pages.

McAfee® Network Security Platform, Version 5.1, Getting Started Guide, revision 8.0, copyright © 2001-2010 McAfee, Inc., 79 pages.

McAfee Network Security Platform, Optimize network protection with next-generation instrusion prevention, Data Sheet, copyright © 2011 McAfee, Inc., 3 pages.

Salowey, J., et al., "Transport Layer Security (TLS) Session Resumption with Server-Side State," Jan. 2008, 20 pages.

International Search Report and Written Opinion for International Application No. PCT/US2013/023121 mailed Jun. 26, 2013.

"Draft Standard for Local and Metropolitan Area Networks—Media Access Control (MAC) Security", IEEE P802.1AE/D5.1, LAN/MAN Standards Committee, IEEE Computer Society, Jan. 19, 2006, 150 pages.

"IEEE Standard for Local and Metropolitan Area Networks—Port-Based Network Access Control", IEEE Std 802.1X (TM)—2004, LAN/MAN Standards Committee, IEEE Computer Society, Dec. 13, 2004, 179 pages.

"Draft Standard for Local and Metropolitan Area Networks—Port-Based Network Access Control—Amendment 1: Authenticated Key Agreement for Media Access Control (MAC) Security", IEEE P802.1af/D0.4, LAN/MAN Standards Committee, IEEE Computer Society, Jan. 16, 2006, 219 pages.

"IEEE Standard for Information Technology—Telecommunications and Information Exchange Between Systems—Local and Metropolitan Area Networks—Specific Requirements, Part 11: Wireless LAN Medium Access Control (MAC) and Physical Layer (PHY) Specifications, Amendment 6: Medium Access Control (MAC) Security Enhancements", IEEE Std 802.11i (TM)—2004, LAN/MAN Standards Committee, IEEE Computer Society, Jul. 23, 2004, 190 pages.

Non-Final Office Action received for the U.S. Appl. No. 11/174,205, mailed on Feb. 20, 2009, 15 pages.

Non-Final Office Action received for the U.S. Appl. No. 11/174,205, mailed on Sep. 3, 2009, 6 pages.

Notice of Allowance received for the U.S. Appl. No. 11/174,205, mailed on Jan. 28, 2010, 6 pages.

Non-Final Office Action received for the U.S. Appl. No. 12/460,736, mailed on Jun. 5, 2012, 18 pages.

Final Office Action received for the U.S. Appl. No. 12/460,736, mailed on Mar. 18, 2013, 6 pages.

Notice of Allowance received for the U.S. Appl. No. 12/460,736, mailed on Jul. 11, 2013, 9 pages.

Non-Final Office Action received for the U.S. Appl. No. 12/655,024, mailed on Sep. 14, 2012, 20 pages.

Final Office Action received for the U.S. Appl. No. 12/655,024, mailed on Feb. 25, 2013, 19 pages.

Non-Final Office Action received for the U.S. Appl. No. 12/655,024, mailed on Aug. 26, 2013, 17 pages.

Notice of Allowance received for U.S. Appl. No. 12/460,736, mailed on Jan. 7, 2014, 6 pages.

Final Office Action received for the U.S. Appl. No. 12/655,024, mailed on Feb. 14, 2014, 6 pages.

International Preliminary Report on Patentability in International Application No. PCT/US2013/023121, mailed Jul. 29, 2014, 6 pages.

USPTO Notice of Allowance received for the U.S. Appl. No. 12/655,024, mailed on Apr. 23, 2014, 5 pages.

* cited by examiner

SYSTEM AND METHOD FOR INNOVATIVE MANAGEMENT OF TRANSPORT LAYER SECURITY SESSION TICKETS IN A NETWORK ENVIRONMENT

TECHNICAL FIELD

This disclosure relates in general to the field of network security and, more particularly, to a system and a method for innovative management of transport layer security session tickets in a network environment.

BACKGROUND

Proliferation of networks, private and public, physical and virtual, has led to an unprecedented access to information, while at the same time, increasing risks of unauthorized access to the networks from various threats, including malware, zero-day attacks, botnets, denial-of-service attempts, and advanced targeted attacks. Moreover, as enterprises consolidate data centers, adopt cloud-services, and virtualize critical infrastructure, they are increasingly seeking ways to unify security management across physical and virtual infrastructures, for example, through comprehensive network security solutions that deliver real-time threat prevention against a wide array of cyber-attacks.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method includes identifying a transport layer security (TLS) session between a client and a server, and parsing one or more TLS messages to identify a session ticket associated with the session. The term 'parsing' in this sense includes any type of evaluating, determining, processing, segmenting, analyzing, etc. The method also includes transforming (e.g., changing, modifying, converting, computing etc.) the session ticket into a fixed (e.g., small) size session token, and managing the session using the session token to identify the session. In some embodiments, the session ticket ranges in size from 32 bytes to 64 Kbytes.

In specific embodiments, the transforming may include computing a hash value of the session ticket using a hashing algorithm and assigning the hash value to the session token. If any of the TLS messages is spread across more than one TLS protocol record, the method includes computing a hash value of a portion of the session ticket encountered in a first TLS protocol record with a hashing algorithm, incrementally computing another hash value of another portion of the session ticket encountered in a subsequent TLS protocol record from the previously computed hash value, and repeating the incremental computing until portions of the session ticket have been processed. In specific embodiments, the hashing algorithm may be chosen from a group comprising: GOST, MD5, SHA-1, SHA-256, RIPEMD-160, and WHIRLPOOL.

In other embodiments, managing the session may include at least one activity selected from a group including: distributing the session token to one or more processing elements; mapping the TLS session to previous TLS sessions using the session token; and performing network security operations to detect network attacks on the TLS session identified by the session token and other features.

EXAMPLE EMBODIMENTS

Figure 1:
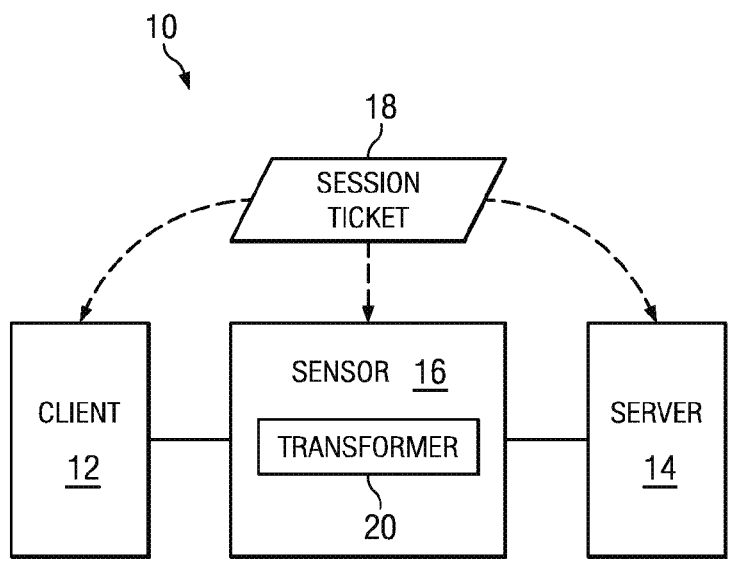
FIG. 1 is a simplified diagram of one embodiment of a communication system for innovative management of transport layer security (TLS) session tickets in a network environment.

Turning to FIG. 1, FIG. 1 is a simplified block diagram of a communication system 10 for innovative management of transport layer security (TLS) session tickets in a network environment according to an embodiment of the present disclosure. The architecture of FIG. 1 may include one or more clients 12 communicating in a TLS session with one or more servers 14. A sensor 16 straddles the TLS communication session and monitors the network traffic between client 12 and server 14 for any network attacks. Server 14 may encapsulate session state for the particular TLS session into a session ticket 18, and forward it to client 12. Client 12 can subsequently resume the session using session ticket 18. Session ticket 18 may be of variable size, ranging from 32 bytes to 64 Kbytes, according to TLS standards. A transformer 20 associated with sensor 16 may facilitate transforming session ticket 18 from variable size to a small fixed size token for ease of management of the TLS session by sensor 16.

TLS is a cryptographic protocol that provides communication security over the Internet. TLS encrypts segments of network connections above the transport layer (e.g., application layer, presentation layer, session layer), using asymmetric cryptography for key exchange, symmetric encryption for privacy, and message authentication codes for message integrity. The TLS protocol allows client-server applications to communicate across a network in a way designed to prevent eavesdropping and tampering. Each party (e.g., client 12, server 14 and sensor 16) saves session information (e.g., session ticket 18, the peer's X.503 certificate, compression method, cipher specification, master secret, etc.), and connection information (e.g., server and client keys for encryption, initialization vector for the cipher, etc.) for each session until the session is terminated.

For example, assume that client 12 and server 14 have decided to use TLS protocol for a communication session. Client 12 and server 14 negotiate a stateful connection by using a handshaking procedure. Session ticket 18 may be created by server 14 during the handshake and sent to client 12. Session ticket 18 can be used to identify the particular TLS session with a set of associated master secret, cryptographic algorithm, etc. If the session is broken for any reason, client 12 may present session ticket 18 to server 14 to resume the session. Session ticket 18 may be authenticated and encrypted to prevent modification or eavesdropping by an attacker.

Session ticket 18 is in an opaque structure (e.g., opaque to client 12) for carrying session-specific state information. For example, session ticket 18 allows: (i) client 12 to provide server 14 with the name of the server it is contacting (e.g., to facilitate secure connections to servers that host multiple virtual servers at a single underlying network address); (ii) client 12 and server 14 to negotiate a maximum fragment length to be sent (e.g., to comply with memory constraints among some clients, and bandwidth constraints among some access networks); and (iii) exchanging other information between client 12 and server 14 that is pertinent to the particular TLS session. When sensor 16 processes the TLS communication session to look for network intrusions, it may allocate data structures in its memory elements that are large enough to hold 64 Kbytes, since the size of a session ticket for the particular session is not known in advance and can be variable.

According to various embodiments, sensor 16 may be a content processing appliance built for detection and prevention of network intrusions, network misuse and distributed denial-of-service (DoS) attacks, among other network threats. Sensor 16 can provide real-time traffic monitoring to detect malicious activity and respond to malicious activity as configured by a network administrator. For example, sensor 16 can analyze traffic on selected network segments and respond when an attack is detected. In various implementations, sensor 16 may examine a header and data portion of network packets, looking for patterns and behavior in the network traffic that indicate malicious activity. Sensor 16 may examine packets according to user-configured policies. If an attack is detected, sensor 16 may respond according to its configured policy (e.g., generate alerts and packet logs, reset TCP connections, scrub malicious packets, etc.). In various embodiments, sensor 16 may complement firewall and antivirus software deployed in enterprises by providing network packet content inspection and protecting against attacks embedded within what a firewall might perceive as seemingly benign network traffic.

In particular embodiments, sensor 16 can analyze and validate network traffic (e.g., between client 12 and server 14) to its basic protocol elements and inspect specific protocol fields, while maintaining full flow and application state. Sensor 16 may perform IP fragment reassembly and transmission control protocol (TCP) stream reassembly, and perform thorough protocol analysis. Once a packet is captured, the packet may be analyzed into its corresponding protocol fields. After sensor 16 analyzes the protocols, it verifies that the packet conforms to the protocol specification and then passes the parsed packet through its engines to detect various types of network attacks. A "network attack" is any unauthorized action taken with the intent of hindering, damaging, incapacitating, or breaching the security of a network. Network attacks may be active, wherein the goal is to directly exploit some vulnerability in a device or software package. Network attacks may also be passive, generally consisting of monitoring or eavesdropping on traffic with the intention of viewing or capturing sensitive data.

In various embodiments, multiple clients 12 may engage in TLS sessions with one or more servers 14 through sensor 16. Sensor 16 may segregate the various network flows according to the respective owners based on the session tickets of each flow, and perform analyses for each such flow. For example, sensor 16 may identify each flow by its corresponding session ticket. Because the size of the respective session tickets is variable for each flow, sensor 16 may allocate 64 Kbytes of memory for each flow, thereby putting a constraint on memory resources within sensor 16 and affiliated network appliances (e.g., manager appliance, router, etc.). Assigning large data structures to identify particular TLS sessions may also increase central processing unit (CPU) utilization for lookups where the long session tickets may be matched with other session tickets that are stored for every new connection or intermediate appliances that process the protocol.

To alleviate such concerns (among others), transformer 20 in sensor 16 can transform session ticket 18 into a unique small fixed size token, for example, 32 bytes, by applying a generic or proprietary algorithm. The small fixed size token may help to optimize allocation of resources per connection basis within sensor 16, for example, parsing, storage, distribution (e.g., to processing elements in a multi-core system), CPU utilization, etc., thus contributing to overall performance and scaling of sensor 16 and associated components, such as service appliances, routers, switches, etc.

Transformer 20 is an application (e.g., computer program) that may be implemented on sensor 16, or on other network elements to facilitate the activities discussed herein. Transformer 20 may be bundled with sensor 16 and/or other network elements, and associated system software, or it may be published separately. As used herein, the term "network element" is meant to encompass computers, network appliances, servers, routers, switches, gateways, bridges, loadbalancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

Elements of FIG. 1 may be coupled to one another through one or more interfaces employing any suitable connection (wired or wireless), which provides a viable pathway for electronic communications. Additionally, any one or more of these elements of FIG. 1 may be combined or removed from the architecture based on particular configuration needs. Communication system 10 may include a configuration capable of transmission control protocol/Internet protocol (TCP/IP) communications for the electronic transmission or reception of packets in a network. Communication system 10 may also operate in conjunction with a user datagram protocol/IP (UDP/IP) or any other suitable protocol, where appropriate and based on particular needs.

Turning to the infrastructure of FIG. 1, sensor 16 is shown in an in-line mode between client 12 and server 14, mediating the flow of traffic between client 12 and server 14 and dropping malicious packets based on granular policy before the packets reach their intended targets. In various embodiments, sensor 16 may be deployed in port-clustering, enabling traffic monitored by multiple ports on a single device (e.g., router or switch) to be aggregated into one traffic stream for stateful inspection analysis. In other embodiments, communication system 10 may support high-availability deployments using redundant sensors, avoiding a single point of failure. Sensor 16 may also be deployed in switch port analyzer (SPAN) and tap modes. In the SPAN mode, sensor 16 may monitor hubs or SPAN ports on multiple switches and can inject several response actions, such as TCP resets, to terminate malicious connections through the monitoring port itself. In tap mode, full-duplex monitoring may allow a direction sensitive view of network traffic, enabling stateful analysis of traffic. In embodiments where a network has two different active paths passing through two different sensor interfaces, the traffic on each path may be analyzed independently.

Sensor 16 may be provisioned on, or form an integral part of, or be associated with, any device that handles TLS protocols, including servers, load balancers, SSL/TLS termination appliances, proxy, Net Cache engines, decryption engines, Intrusion Prevention Systems, firewall, or other security appliances. Transformer 20 may be implemented on any application that uses TLS like web browsers, etc. Each network connection between client 12 and server 14 may be processed by more than one sensor 16. Moreover, a plurality of sensors may be deployed in each network and each sensor may be provisioned with transformer 20.

Not shown in FIG. 1 are components that may be associated with sensor 16, such as manager hardware/controller, routers, switches, and other network elements. For example, a manager platform associated with sensor 16 may include a dedicated server hosting manager platform software to configure/control operations of sensor 16. The manager platform may allow remote access of sensor 16 from within the enterprise network. Communication system 10 may also include databases (e.g., for storing persistent configuration information, policies, vulnerabilities, session ticket tables, etc.) that may be communicable with sensor 16. Various components associated with sensor 16 may provide for collecting and analyzing traffic from hosts and applications to detect worms, botnets, etc.

As used herein, the terms "client" and "server" are inclusive of applications (e.g., Web browsers), and devices (e.g., computers, laptops, mobile phones, mobile computing devices, mainframes, etc.) that perform functionalities associated with a client/server distributed computer networking architecture. Clients (e.g., 12) typically requests and receives information over a network from a server (e.g., 14), for example, by sending messages. Servers (e.g., 14) may respond to their clients by acting on each request and returning results. One server (e.g., 14) generally supports numerous clients (e.g., 12), and multiple servers can be networked together in a pool to handle increased processing load as the number of clients grows. In some cases, a device that is a server for one application can simultaneously act as a client to other servers for different applications.

The network of communication system 10 offers a communicative interface between any of the components of FIG. 1, and may be any local area network (LAN), wireless local area network (WLAN), metropolitan area network (MAN), wide area network (WAN), virtual private network (VPN), Intranet, or any other appropriate architecture or system that facilitates communications in a network environment. The network may implement a UDP/IP connection and use a TCP/IP communication language protocol in particular embodiments of the present disclosure. However, the network may alternatively implement any other suitable communication protocol for transmitting and receiving data packets within communication system 10.

For purposes of illustrating certain example techniques of communication system 10, it is important to understand the communications that may be traversing the network. The following foundational information may be viewed as a basis from which the present disclosure may be properly explained. Such information is offered earnestly for purposes of explanation only and, accordingly, should not be construed in any way to limit the broad scope of the present disclosure and its potential applications.

The goal of the TLS protocol is to provide privacy and data integrity between two communicating applications. The protocol is composed of two layers: the TLS Record Protocol, which is a lower layer and the TLS Handshake Protocol, which is a higher layer. The TLS Record Protocol (which is layered on top of some reliable transport protocol such as TCP) provides connection security with two properties: (i) the connection is private; and (ii) the connection is reliable. To ensure privacy of the connection, symmetric cryptography is used for data encryption. The keys for this symmetric encryption are generated uniquely for each connection and are based on a secret negotiated by another protocol (such as the TLS Handshake Protocol). The TLS Record Protocol can also be used without encryption.

The message transport includes a message integrity check using a keyed message authentication code (MAC). Secure hash functions (e.g., SHA-1, etc.) are used for the MAC computations. The TLS Record Protocol is a layered protocol. At each layer, messages may include fields for length, description, and content. The TLS Record Protocol takes messages to be transmitted, fragments the data into manageable blocks, optionally compresses the data, applies a MAC, encrypts, and transmits the result. Received data is decrypted, verified, decompressed, reassembled, and then delivered to higher-level clients.

The TLS Record Protocol is used for encapsulation of various higher level protocols such as the TLS Handshake Protocol, which allows the server and client to authenticate each other and to negotiate an encryption algorithm and cryptographic keys before the application protocol transmits or receives its first byte of data. The TLS Handshake Protocol provides connection security that has three properties: (i) the peer's identity can be authenticated using asymmetric, or public key, cryptography; (ii) the negotiation of a shared secret is secure (e.g., the negotiated secret is unavailable to eavesdroppers, and for any authenticated connection the secret cannot be obtained, even by an attacker who can place himself in the middle of the connection); and (iii) the negotiation is reliable (e.g., no attacker can modify the negotiation communication without being detected by the parties to the communication).

Figure 2:
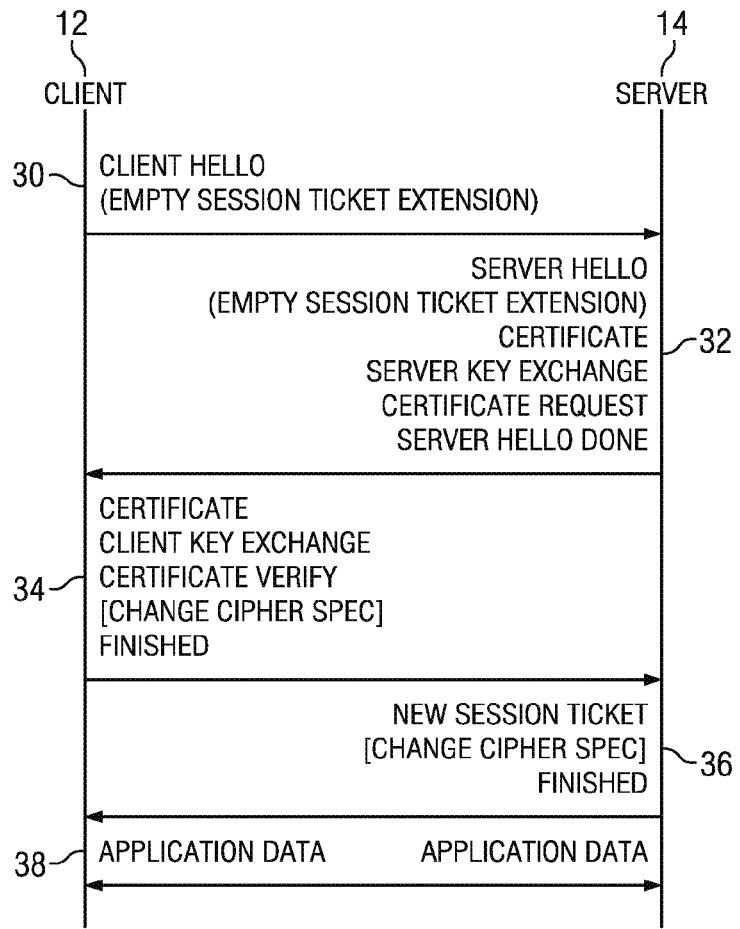
FIG. 2 is a simplified flow diagram illustrating an example exchange of TLS messages.

Turning to FIG. 2, FIG. 2 is a simplified flow diagram illustrating the TLS handshake protocol in implementations that support session tickets. The example protocol shown in FIG. 2 is according to TLS standards, for example, Request for Comments (RFC) 4507, proposed by Internet Engineering Task Force (IETF) standards track. Communication using the TLS protocol occurs by way of TLS messages that establish a set of negotiated security algorithms. The TLS protocol exchanges messages in the form of protocol records, which encapsulate the data to be exchanged. Each protocol record can be compressed, padded, appended with MAC, or encrypted, etc. depending on the state of the connection. Each record can include a content type field that specifies the record, a length field and a TLS version field. A single TLS record may be up to 16384 octets in length, but a TLS message may span multiple TLS records. A reasonable choice of maximum acceptable message length in many implementations may be 64 KB.

For example, client 12 can indicate that it supports mechanisms for session ticket 18 by including a session ticket extension in a ClientHello message 30. The extension may be empty if client 12 does not already possess a session ticket for server 14 (e.g., such as in a new connection). If client 12 possesses a session ticket that it wants to use to resume a session, then it can include the session ticket in the Session Ticket extension in ClientHello message 30. Server 14 may respond with an empty session ticket extension in a ServerHello message 32 to indicate that it will send a new session ticket later.

In certain cases, server 14 sends a ServerKeyExchange message with ServerHello message 32, including additional information required for establishing a shared secret (for example, the 512-bit export-grade RSA key for RSA export key-exchange). If server 14 wishes that client 12 authenticate itself, it also sends a CertificateRequest message listing acceptable certificate types and Certificate Authority names for the client's certificate chain.

If server 14 requests client authentication, client 12 begins its response message 34 with a Certificate message that includes its certificate chain, and, a ClientKeyExchange message (including any information necessary to determine the shared secret), and a CertificateVerify message that includes its signature on a digest of the handshake messages to that point. Client 12 also sends a ChangeCipherSpec message, signaling its switch to the newly negotiated parameters and secret key. The change cipher spec message is sent during the handshake after the security parameters have been agreed upon. Client 12 finally sends an encrypted and compressed Finished message that includes a digest of the handshake messages.

Server 14 in turn, also sends a ChangeCipherSpec message and a Finished message that includes a digest of the handshake messages (up to the client's Finished message). Server 14 may store its session state (such as ciphersuite and master secret) to a ticket that is encrypted and integrity-protected by a key known only to server 14. The ticket is distributed to the client using a NewSessionTicket message 36, which is included in a hash used to create and verify the Finished message. Client 12 caches this ticket along with the master secret and other parameters associated with the current session. When client 12 wishes to resume the session, it includes the ticket in the SessionTicket extension within ClientHello message 30. Server 14 then decrypts the received ticket, verifies the ticket's validity, retrieves the session state from the contents of the ticket, and uses this state to resume the session. Application data 38 may be subsequently encrypted and exchanged between client 12 and server 14.

Figure 3:
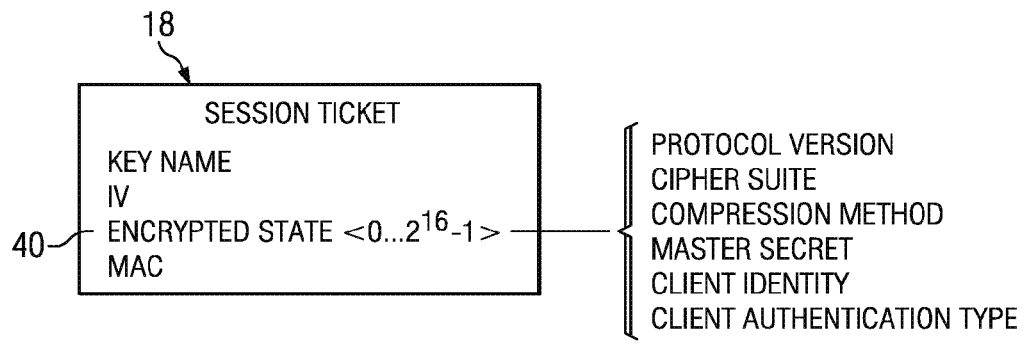
FIG. 3 is a simplified diagram illustrating an example TLS session ticket.

Turning to FIG. 3, FIG. 3 is a simplified diagram of an example session ticket 18. Session ticket 18 may be opaque to client 12, so the structure is not subject to interoperability concerns, and implementations may diverge from this format. The example structure shown in FIG. 3 is according to TLS standards, for example, RFC 5077. Session ticket 18 may include a key name, which can identify a particular set of keys used to protect session ticket 18. Keys enable server 14 to easily recognize tickets it has issued. The key name may be randomly generated in one implementation.

State information 40 is encrypted using a 128-bit key for Advanced Encryption Standard (AES) in Cipher Block Chaining (CBC) mode encryption with a given Initialization vector (IV). The MAC may be calculated using hashing algorithms, such as Hash-based Message Authentication Code-Secure Hash Algorithm 256 (HMAC-SHA-256) over key_name (16 octets) and IV (16 octets), followed by the length of the encrypted_state field (2 octets) and its contents (variable length). The contents of state information 40 may include protocol version, cipher suite, compression method, master secret, client identity, client authentication type, etc. Various implementations may store different information; for example, Kerboros authentication mechanism may store a client identity data that may be different from the example shown in FIG. 3.

Session ticket 18 may prevent security breaches in the TLS session. For example, if an eavesdropper obtains the session ticket and attempts to use the ticket to establish a session with the server, because the ticket is encrypted and the attacker does not know the secret key, the stolen ticket does not help the attacker resume a session. In another example, a malicious user could forge or alter the ticket in order to resume a session, to extend its lifetime, to impersonate as another user, or to gain additional privileges. However, such an attack is not possible if the ticket is protected using a strong integrity protection algorithm such as a keyed HMAC-SHA1. Thus, due to various security considerations, including the amount of information carried in the session ticket, the size of session tickets is variable, ranging from 32 bytes to 64 Kbytes (unlike Secure Sockets Layer (SSL) session identifiers, which are of fixed length (32 bytes).

TLS is the default standard for providing application security and is extensively used globally by several client/server applications for handling secure transactions. TLS session tickets have been defined to overcome some of the security issues and limitations seen in previous SSL/TLS protocols. The TLS session ticket, which enables stateless session resumption, is relatively new and gaining traction for use by servers that support hypertext transfer protocol secure (HTTPS) and by various end system applications like web browsers etc. However, TLS typically uses RSA authentication algorithms for encryption/decryption, leading to computationally expensive processes. For example, TLS web servers incur significant performance penalty relative to regular web servers running on the same platform. Session caching by reusing session tickets can help to speed up TLS computations; however, session caching puts additional constraints on memory resources, lookups, etc. due to the large variable size of the session tickets. Any device that handles TLS protocol like server, load balancers, SSL/TLS termination appliances, proxy, Net Caches Engines, Decryption Engines, Firewall, or any security appliance and applications like web browsers etc. may face resource constraints such as memory per connection, distribution and CPU cycles. This could affect overall handling capability (e.g., performance, bandwidth, etc.), resulting in reduced scalability.

Figure 4:
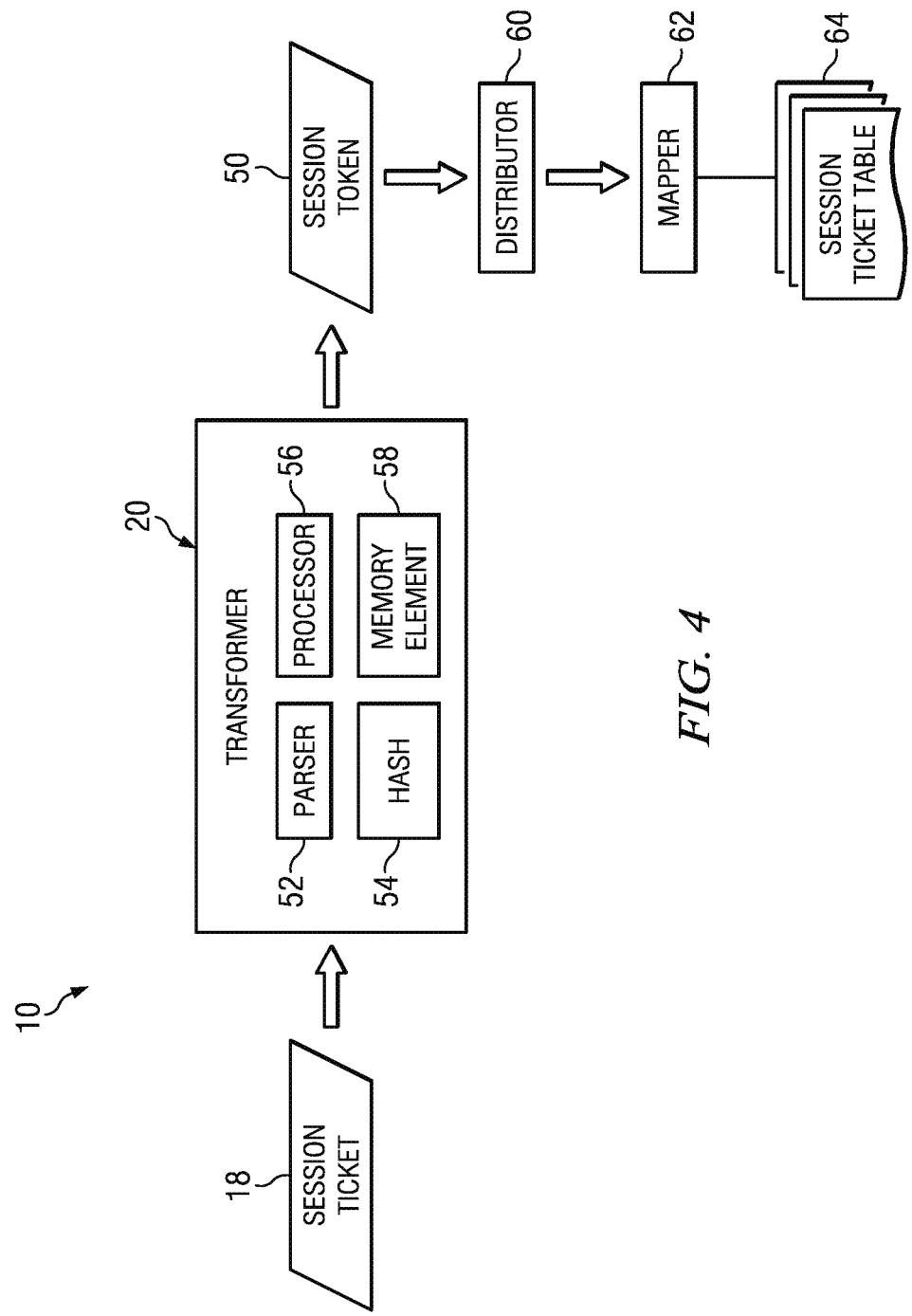
FIG. 4 is a simplified block diagram illustrating details according to an embodiment of the communication system.

Communication system 10, according to various embodiments, can overcome these issues (and others) in providing for innovative management of TLS session tickets in a network environment. Turning to FIG. 4, FIG. 4 is a simplified block diagram illustrating details of communication system 10. Session ticket 18 may be processed by transformer 20 to a session token 50, which can be of small fixed size (e.g., 32 bytes, or 20 bytes, etc.). A parser 52 in transformer 20 checks whether the connection between client 12 and server 14 is SSL or TLS. For a TLS connection, parser 52 identifies session ticket 18 from the messages (e.g., ClientHello message 30, ServerHello message 32, NewSessionTicket message 36, etc.).

Hash 54 may feed the variable session ticket data to a hash algorithm to generate session token 50. The hashing algorithm may be implemented on hardware, such as a processor 56 and a memory element 58. The hashing algorithm may be virtually any cryptographic hashing algorithm, including one of: GOST, MD5, SHA-1, SHA-256, RIPEMD-160, and WHIRLPOOL. The size of session token 50 may vary with the particular hashing algorithm used. For example, a proprietary hashing algorithm may convert session ticket 18 of size 64 Kbyte to session token 50 of size 32 bytes; MD5 may generate session token 50 of size 16 bytes; SHA-1 algorithm may generate a 20 byte session token 50; GOST may generate a 32 byte session token 50; WHIRLPOOL may generate a 64 byte session token 50.

In one example, MD5 may process variable-length session ticket 18 into a fixed-length session token 50 (e.g., of 16 bytes). In some implementations, session ticket 18 may be broken up into chunks of 512-bit blocks; session ticket 18 may be padded so that its length is divisible by 512. The padding may be effected by appending a single bit, 1, to the end of session ticket 18, followed by as many zeros as are required to bring the length of the message up to 64 bits fewer than a multiple of 512. The remaining bits are filled up with a 64-bit little endian integer representing the length of the original message (e.g., session ticket 18), in bits. The 128-bit (16-byte) MD5 hash (e.g., session token 50) is typically represented as a sequence of 32 hexadecimal digits.

In some embodiments, session ticket 18 (maximum size 64 Kbyte) can be segmented/fragmented across several TLS protocol records. This can occur, for example, when NewSessionTicket message 36 spans multiple protocol records. In some such embodiments, an incremental hash can be computed over the various protocol records (e.g., tracked by means of a state) into session token 50. For example, a hash $\mu$ may be computed for a portion of the session ticket in a first encountered TLS protocol record. A new hash $\mu^*$ may be computed for the next protocol record from the old hash $\mu$ using suitable incremental hash methods. The process may be continued until all TLS protocol records containing portions of session ticket 18 have been processed. The resulting hash value may be assigned to session token 50.

In another embodiment, each TLS protocol record may be parsed for a portion of the session ticket, and the portion of the session ticket may be stored in a fragment. The fragments may be aggregated to generate information contained in session ticket 18. Since session ticket 18 is reduced to a fixed size session token 50 (e.g., of 32 bytes) it could fit in one cache line and hence the comparisons may be faster, thereby reducing the complexity in distribution and storage of such tickets. Various other hashing methods for transforming variable size session ticket 18 to fixed size session token 50 may be implemented within the broad scope of the present disclosure.

Session token 50 may be used in place of session ticket 18 to manage the session within sensor 16 and associated components. In one embodiment, session ticket 18 may be discarded by sensor 16 after session token 50 is generated. In another embodiment, session ticket 18 may be stored and not discarded. According to various embodiments, session token 50 may be used by a distributor 60, for example, to distribute the information therein to various processing cores to perform functions associated with sensor 16. Session token 50 may be used by a mapper 62, for example, to match the information therein with information contained in a session ticket table 64. Session ticket table 64 may comprise information related to state and other parameters of each network flow, which is processed by sensor 16.

Sensor 16 may process packets in each network flow identified by respective session token 50. In some embodiments, sensor 16 may decrypt the TSL traffic using information provided in session ticket 18, and stored as session token 50. Once decrypted, sensor 16 may inspect the traffic for intrusions. For example, incoming packets may be inspected for strings that match known attack signatures. Findings may be summarized and sent to appropriate response modules along with the network flow identifier, represented by session token 50. Appropriate policies and responses may be implemented on the network flow identified by session token 50.

In various embodiments, the protocol version and the presence or absence of session ticket 18 may be maintained in a per connection state variable. The TLS protocol records may be individually parsed to get the size and other session ticket data. The TLS protocol records may contain information to manage one or more of the following functions: (i) dividing outgoing messages into manageable blocks, and reassembling incoming messages; (ii) compressing outgoing blocks and decompressing incoming blocks; (iii) applying MAC to outgoing messages, and verifying incoming messages using the MAC; and (iv) encrypting outgoing messages and decrypting incoming messages.

Figure 5:
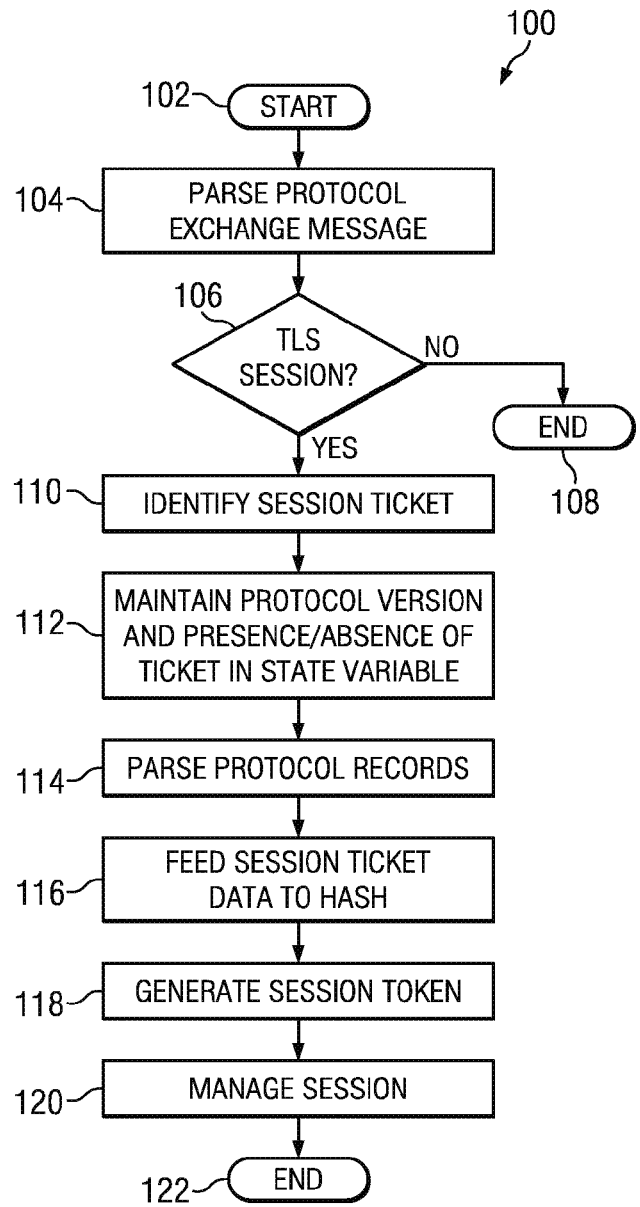
FIG. 5 is a simplified flow diagram illustrating a set of example activities that may be associated with embodiments of the communication system in accordance with the present disclosure.

Turning to FIG. 5, FIG. 5 is a simplified flow diagram illustrating example operations that may be associated with embodiments of communication system 10. Operations 100 start at 102, when client 12 initiates a TLS session with server 14. At 104, parser 52 may parse the protocol exchange message to identify whether the session is a TLS session or an SSL session. At 106, a determination as to whether the session is a TLS session is made. If the session is an SSL session, the operations end at 108. Otherwise, if the session is a TLS session, session ticket 18 may be identified at 110. The protocol version and presence/absence of session ticket 18 may be maintained in a state variable at 112. At 114, TLS protocol records may be parsed to determine data contained in session ticket 18. In some cases, all the data may be present in one data packet comprising session ticket 18. In other cases, the data may be spread across several data packets, depending on the size of the packet length.

At 116, session ticket data may be fed to hash 54 for processing using a suitable hashing algorithm. Session token 50 may be generated at 118. At 120, session token 50 (and not session ticket 18) may be used to manage session by sensor 16. For example, sensor 16 may distribute session token 50 to multiple processing elements; map the session to previous sessions using session token 50; perform network security operations to detect network attacks on the session identified by the session token 50; and perform other operations as needed using session token 50 to identify the particular session. The operations end at 122, for example, when the session is terminated.

Although communication system 10 has been described herein as facilitating transforming session ticket 18 in a TLS session, it may be noted that the system and operations described herein can be, nonetheless, generally applied to transform any other large or variable size data structure specific to SSL or TSL protocols to a small fixed size token, saving CPU bandwidth, management, enhanced performance trade-off and scaling. For example, entire SSL/TLS certificates or part of the certificate, such as the public key, may be transformed to a corresponding small fixed size token.

In example embodiments, at least some portions of the activities outlined herein may be implemented in non-transitory logic (i.e., software) provisioned in, for example, sensor 16 (or in client 12, or server 14). This can include one or more instances of transformer 20 (e.g., including parser 52 and/or hash 54) being provisioned in various locations of the network. In some embodiments, one or more of these features may be implemented in hardware, provided external to these elements, or consolidated in any appropriate manner to achieve the intended functionality. Sensor 16, client 12, and/or server 14 may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, components of communication system 10 described and shown herein may also include suitable interfaces for receiving, transmitting, and/or otherwise communicating data or information in a network environment. Additionally, some of the processors and memory associated with the various network elements may be removed, or otherwise consolidated such that a single processor and a single memory location are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory (e.g., memory element 58) can store data used for the operations described herein. This includes the memory being able to store instructions (e.g., software, logic, code, etc.) that are executed to carry out the activities described in this Specification. A processor can execute any type of instructions associated with the data to achieve the operations detailed herein in this Specification. In one example, one or more processors (e.g., processor 56) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of memory element (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

Note that with the numerous examples provided herein, interaction may be described in terms of two, three, four, or more network elements. However, this has been done for purposes of clarity and example only. It should be appreciated that the system can be consolidated in any suitable manner. Along similar design alternatives, any of the illustrated computers, modules, components, and elements of the FIGURES may be combined in various possible configurations, all of which are clearly within the broad scope of this Specification. In certain cases, it may be easier to describe one or more of the functionalities of a given set of flows by only referencing a limited number of network elements. It should be appreciated that communication system 10 of the FIGURES and its teachings are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols in which packets are exchanged in order to provide mobility data, connectivity parameters, access management, etc. Moreover, although communication system 10 has been illustrated with reference to particular elements and operations that facilitate the communication process, these elements and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:
1. A method, comprising:
 identifying a transport layer security (TLS) session between a client and a server;
 parsing a TLS message spread across a plurality of TLS protocol records to identify a session ticket associated with the TLS session;

computing a first hash value for a first portion of the session ticket in a first TLS protocol record of the plurality of TLS protocol records, the session ticket including a key name;

computing a second hash value for a second portion of the session ticket in a next TLS protocol record of the plurality of TLS protocol records, from the first hash value, to incrementally produce a hash value of the session ticket;

assigning the incrementally-produced hash value of the session ticket to a session token; and managing the TLS session using the session token to identify the TLS session and to detect a network attack on the TLS session.

2. The method of claim 1, wherein a size of the session ticket is between 32 bytes and 64 Kbytes.

3. The method of claim 1, wherein a hashing algorithm used in the computing the first hash value and the computing the second hash value is chosen from a group consisting of: GOST, MD5, SHA-1, SHA-256, RIPEMD-160, and WHIRLPOOL.

4. The method of claim 1, wherein the managing comprises mapping the TLS session to previous sessions using the session token.

5. The method of claim 1, further comprising:
incrementally computing hash values for portions of the session ticket in subsequent TLS protocol records of the plurality of TLS protocol records, until all portions of the session ticket have been processed.

6. The method of claim 1, wherein the session ticket includes at least one of a group consisting of: a protocol version, a cipher suite, a compression method, a master secret, and a client identity.

7. The method of claim 1, wherein the session ticket includes an initialization vector and a message authentication code based on the initialization vector.

8. An apparatus, comprising:
a memory element configured to store instructions; and
at least one processor operable to execute the instructions and configured to
identify a transport layer security (TLS) session between a client and a server;
parse a TLS message spread across a plurality of TLS protocol records to identify a session ticket associated with the TLS session;
compute a first hash value for a first portion of the session ticket in a first TLS protocol record of the plurality of TLS protocol records, the session ticket including a key name;
compute a second hash value for a second portion of the session ticket in a next TLS protocol record of the plurality of TLS protocol records, from the first hash value, to incrementally produce a hash value of the session ticket;
assign the incrementally-produced hash value of the session ticket to a session token; and
manage the TLS session using the session token to identify the TLS session and to detect a network attack on the TLS session.

9. The apparatus of claim 8, wherein a size of the session ticket is between 32 bytes and 64 Kbytes.

10. The apparatus of claim 8, wherein a hashing algorithm used in computing the first hash value and the second hash value is chosen from a group consisting of: GOST, MD5, SHA-1, SHA-256, RIPEMD-160, and WHIRLPOOL.

11. The apparatus of claim 8, wherein the at least one processor is configured to use the session token to map the TLS session to previous sessions using the session token.

12. The apparatus of claim 8, wherein the session ticket includes at least one of a group consisting of: a protocol version, a cipher suite, a compression method, a master secret, and a client identity.

13. The apparatus of claim 8, wherein the session ticket includes an initialization vector and a message authentication code based on the initialization vector.

14. Logic, encoded in non-transitory media, that includes code for execution and, when executed by a processor, is operable to perform operations comprising:
identifying a transport layer security (TLS) session between a client and a server;
parsing a TLS message spread across a plurality of TLS protocol records to identify a session ticket associated with the TLS session;
computing a first hash value for a first portion of the session ticket in a first TLS protocol record of the plurality of TLS protocol records, the session ticket including a key name;
computing a second hash value for a second portion of the session ticket in a next TLS protocol record of the plurality of TLS protocol records, from the first hash value, to incrementally produce a hash value of the session ticket;
assigning the incrementally-produced hash value of the session ticket to a session token; and
managing the TLS session using the session token to identify the TLS session and to detect a network attack on the TLS session.

15. The logic of claim 14, wherein a size of the session ticket is between 32 bytes and 64 Kbytes.

16. The logic of claim 14, wherein a hashing algorithm used in the computing the first hash value and the computing the second hash value is chosen from a group consisting of: GOST, MD5, SHA-1, SHA-256, RIPEMD-160, and WHIRLPOOL.

17. The logic of claim 14, wherein the managing comprises mapping the TLS session to previous TLS sessions using the session token.

18. The logic of claim 14, the operations further comprising:
incrementally computing hash values for portions of the session ticket in subsequent TLS protocol records of the plurality of TLS protocol records, until all portions of the session ticket have been processed.

19. The logic of claim 14, wherein the session ticket includes at least one of a group consisting of: a protocol version, a cipher suite, a compression method, a master secret, and a client identity.

20. The logic of claim 14, wherein the session ticket includes an initialization vector and a message authentication code based on the initialization vector.

* * * * *